(12) United States Patent
Neumann et al.

(10) Patent No.: US 8,714,637 B2
(45) Date of Patent: May 6, 2014

(54) CHASSIS STRUCTURE FOR A MOTOR VEHICLE

(71) Applicant: Benteler Automobiltechnik GmbH, Paderborn (DE)

(72) Inventors: Hans-Jürgen Neumann, Bielefeld (DE); Stephan Meyer, Bielefeld (DE); Wolfram Linnig, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/685,184

(22) Filed: Nov. 26, 2012

(65) Prior Publication Data
US 2013/0140853 A1    Jun. 6, 2013

(30) Foreign Application Priority Data
Dec. 2, 2011   (DE) .......................... 10 2011 055 993

(51) Int. Cl.
*B60N 3/00* (2006.01)
(52) U.S. Cl.
USPC ....................................................... 296/204
(58) Field of Classification Search
USPC ....................................................... 296/204
See application file for complete search history.

(56) References Cited

U.S. PATENT DOCUMENTS

| | | | |
|---|---|---|---|
| 2,705,660 A * | 4/1955 | Giacosa ....................... 296/204 |
| 5,800,024 A | 9/1998 | Steimmel et al. |
| 6,059,314 A | 5/2000 | Streubel et al. |
| 6,099,039 A * | 8/2000 | Hine ............................ 280/781 |
| 6,104,012 A | 8/2000 | Durand |
| 6,234,375 B1 | 5/2001 | Durand |
| 7,261,307 B2 | 8/2007 | Nuno et al. |
| 2005/0109769 A1 | 5/2005 | McClure et al. |
| 2008/0191443 A1 | 8/2008 | Gabbianelli et al. |

FOREIGN PATENT DOCUMENTS

| | | |
|---|---|---|
| DE | 196 43 001 A1 | 4/1998 |
| DE | 196 49 076 A1 | 5/1998 |
| DE | 199 22 800 A1 | 11/1999 |
| DE | 100 45 230 A1 | 3/2003 |
| DE | 10 2009 012551 A1 | 9/2010 |
| DE | 102009019320 A1 | 11/2010 |
| EP | 0 713 791 A1 | 5/1998 |
| EP | 1 642 754 A1 | 4/2006 |
| EP | 1 690 780 A1 | 8/2006 |
| EP | 1 935 551 A1 | 6/2008 |
| WO | WO 2012/084117 A1 | 6/2012 |

* cited by examiner

*Primary Examiner* — Lori Lyjak
(74) *Attorney, Agent, or Firm* — Feiereisen LLC

(57) ABSTRACT

A chassis structure for a motor vehicle includes an extruded base member made of light metal and a reinforcing member made of steel to reinforce the base member. The base member has two walls which are spaced from one another by a distance, with the reinforcing member connecting free ends of the walls. The reinforcing member and the base member are joined to one another using electromagnetic pulse welding.

14 Claims, 2 Drawing Sheets

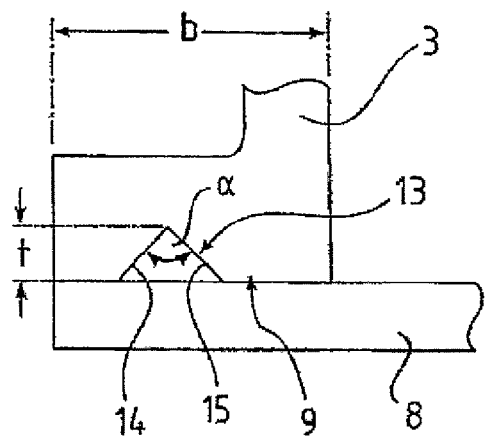
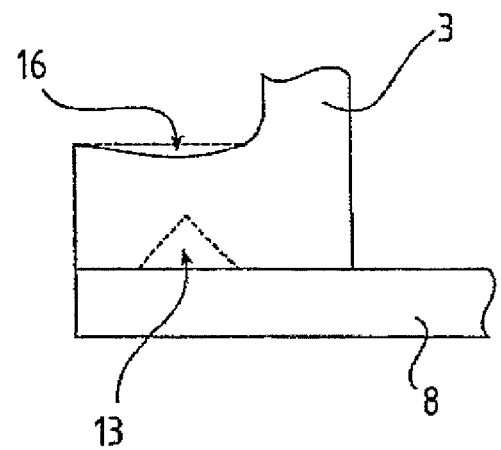
Fig. 3a    Fig. 3b
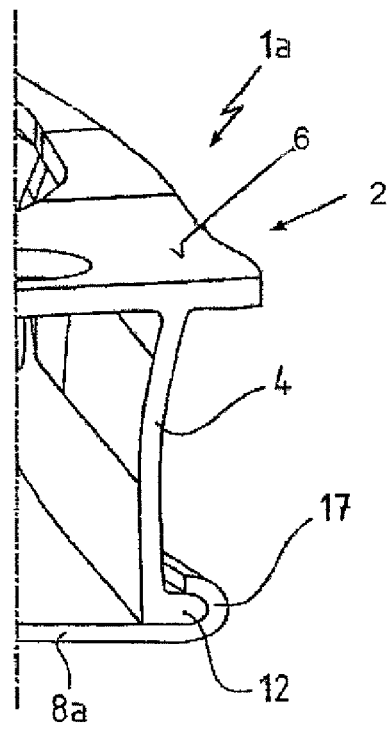
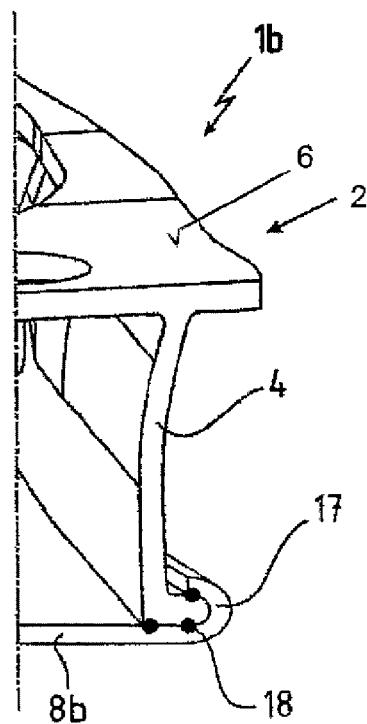
Fig. 4    Fig. 5

CHASSIS STRUCTURE FOR A MOTOR VEHICLE

CROSS-REFERENCES TO RELATED APPLICATIONS

This application claims the priority of German Patent Application, Serial No. 10 2011 055 993.0, filed Dec. 2, 2011, pursuant to 35 U.S.C. 119(a)-(d), the content of which is incorporated herein by reference in its entirety as if fully set forth herein.

BACKGROUND OF THE INVENTION

The present invention relates to a chassis structure for a motor vehicle.

The following discussion of related art is provided to assist the reader in understanding the advantages of the invention, and is not to be construed as an admission that this related art is prior art to this invention.

Solutions involving constructive, technological and material-based lightweight constructions gain increasingly importance to reduce weight of chassis structures for motor vehicles in order to decrease fuel consumption and weight. In particular lightweight materials such as aluminum play an important role to reduce the so-called unsprung masses in the chassis region. This trend is further accelerated by the demand for low-emission and exhaust-free vehicles having hybrid or electric drive which because of the need for electric components adds significant weight that must be compensated by reducing the weight of other components. To ensure high strength and stiffness properties of chassis structures that are subject to high stress, such as pivot bearings, suspension arms, guide arms, A-arms, etc., while still having smallest possible own weight, demand for chassis components that are forged of aluminum with yield strength Rp0.2 of above 300 MPa and elongation at rupture A5 of above 10% increasingly grows. In addition, the use of extruded profiles of light metal, in particular chassis structures like suspension arms produced from extruded profiles of aluminum, gain more and more importance in view of their potential for lightweight construction as a result of their less massive cross sectional configurations compared to forged parts.

Besides yield strength as design criterion, chassis structures are also designed with stiffness in mind to cope with defined buckling loads, in particular load situations and crash events. Stiffness is predominantly dependent on cross sectional design and the modulus of elasticity of the used material. The modulus of elasticity of aluminum is about 70,000 kN/mm$^2$ and thus three times smaller than the modulus of elasticity of steel. This causes the unwanted situation that the cross section of stiffness-critical structural zones of forged parts must be made even bulkier in order to obtain the required stiffness, resulting in added mass and thus higher weight.

In view of the trend for more compact constructions of automobiles also in the area of the chassis, the limitation of available installation space does not allow any increase in the cross section of structures in order to realize the required values for stiffness-relevant moments of resistance of cross sections of the structures, e.g. by using open or closed profiles of greater diameter to meet lightweight conditions.

As the stiffness-relevant modulus of elasticity of lightweight materials like aluminum and also other materials can be influenced only to a very limited extent, other approaches involve the use of a composite of materials that have a higher modulus of elasticity. For example, steel attachments of various geometrical shape and thickness having a modulus of elasticity of about 210,000 kN/mm$^2$ can be forged onto stiffness-relevant regions of forged aluminum parts. A problem associated with this approach is the susceptibility of galvanic corrosion in galvanic relevant contact zones between aluminum as base material and the steel attachment and the corrodibility of the steel surface itself. This is especially a problem when considering that forged aluminum parts cannot be coated with an additional corrosion protection for cost reasons.

It is also known to employ different types of composites, e.g. layered composites, particle composites or fiber composites, etc. for various applications. This involves a layering of different materials. Cost reasons normally prohibit the use of such technologies for compact structures subject to high stress. High manufacturing costs also prohibit the use of metal matrix composites (MMC) which have increased modulus of elasticity through incorporation of ceramic fibers in the aluminum matrix. Approaches based on the use of CRP (Carbon-fiber-Reinforced Plastic), as known from motor sport, are also not an option for application in the conventional automotive field in view of their high costs and fairly brittle and low-deformation fracture behavior.

As described above, extruded profiles of light metal gain increasingly importance in addition to forged chassis structures. When chassis components such as suspension arms of extruded profiles with closed or open cross sections are involved, similar or same shortcomings are encountered as those stated above. Chassis structures of extruded profiles have cross sections that must be dimensioned over their entire length to suit the stiffness-critical section, even though this section normally constitutes only a small portion of the overall length of the structure. Thus, the extruded profiles are manufactured with a cross sectional geometry whose entire length is dimensioned to cope with an expected maximum load. Excess material that does not contribute to the stiffness and strength behaviors of the chassis structure is normally stripped mechanically to reduce weight of the structures. This requires additional expensive measures for machining the chassis structures and also for recovery and use of produced light metal scrap.

As each vehicle model family, depending on motorization and other equipment options, normally requires weight-optimized chassis structures for different load groups, extruded profiles of light metal require different cross sections. As a result, individual load group modifications require separate constructions, incurring significant added costs for employing different extrusion and machining tools and adding to the complexity of logistics.

It would therefore be desirable and advantageous to provide an improved chassis structure for a motor vehicle to obviate prior art shortcomings.

SUMMARY OF THE INVENTION

According to one aspect of the present invention, a chassis structure for a motor vehicle includes an extruded base member made of light metal and having two walls arranged in spaced-apart relationship and having free ends, and a reinforcing member made of steel to reinforce the base member and connecting the free ends of the walls, wherein the reinforcing member and the base member are joined to one another using electromagnetic pulse welding.

In accordance with the present invention, an open base member is used which can be closed in part in strength-relevant and/or stiffness-relevant zones or sections by the reinforcing member that is advantageously made of a high-strength and high-stiffness material.

According to another advantageous feature of the present invention, the reinforcing member may be made from a steel sheet by which the free ends of the walls are connected in a section of the base member that requires stiffness and/or strength. Such a section may, for example, be a spring bearing surface when a suspension arm is involved. The connection between the extruded base member and the reinforcing member of steel is durable and is realized by a material joint. Welding is realized in the absence of any heat being introduced into the components so that the microstructure is not impacted. Thus, metallic materials having widely different welding points can be welded.

The invention is based on the recognition that application of the electromagnetic pulse technology (EMPT) for chassis structures allows realization of a material joint between light metal alloys, in particular aluminum alloys, and high strength or super high strength steel, without adversely affecting material strength. Electromagnetic pulse welding accelerates a pulsed electromagnetic field in one of the two components, advantageously the reinforcing member, in the joining zone. The reinforcing member may hereby be accelerated in the joining zone over a distance of 0.3 mm to 2.0 mm to speeds of above 200 m/s. When the reinforcing member impacts the ends of the base member, the oxide layers adhering to both surfaces are detached and blown off in the joining zone. The thus-produced clean surfaces are highly reactive and are under extreme contact pressure. As a result, a metallic bond is formed due to an electron exchange. This has also the advantage that joining forces can be controlled in a very precise manner so that the joining process can be best suited to material-based and/or geometric parameters of the chassis structure at hand.

According to another advantageous feature of the present invention, each end of the walls can be formed with an indentation to receive material from the end deformed as a result of pulse welding. The indentation forms a free space in which the material of the ends during the joining process is accelerated. This improves quality of the connection. The indentation may be provided over the entire length of the ends or only in the area of the connection, and may be formed during extrusion. It is, of course, also conceivable to apply a machining process, for example milling, in order to produce the indentations in the ends with the required length in the section being reinforced.

According to another advantageous feature of the present invention, the indentation in each end of the walls may also be used to receive material from the reinforcing member that has been accelerated into the free space formed by the indentation and formed into the indentation as a result of pulse welding.

According to another advantageous feature of the present invention, the indentation can have a depth between 0.5 mm and 2.0 mm, advantageously in the range of 1.2 mm to 1.7 mm. Currently preferred is a depth of the indentation of about 1.5 mm.

According to another advantageous feature of the present invention, the indentation can be bounded by two side faces that extend at an incline in relation to one another to define an angle in a range between 120° and 160°. Currently preferred is an angle of about 150°. Also this measure promotes the presence of a high-quality joint between the base member and the reinforcing member.

The extruded base member can be designed with one open side and can have a hat-shaped cross section with two side walls connected by a bottom or web. The free ends of the walls may each be formed with a flange that projects laterally out from the walls. When a suspension arm is involved, the flanges may have a width of about 16 mm.

According to another advantageous feature of the present invention, the reinforcing member can have a coating to ensure corrosion resistance. The use of galvanized or aluminized reinforcing members may find application or reinforcing members having a different type of coating may be used. Also in this context, the use of electromagnetic pulse welding is beneficial as joining process between the base member and a coated reinforcing member.

Depending on strength and stiffness requirements, the reinforcing member may have folded ends for embracing the ends of the walls of the base member. Advantageously, the reinforcing member can have lateral flanged folds to embrace the ends or flanges at the ends. Besides the material joint realized through pulse welding, an additional formfitting connection is established. Thus, there are various options available that can be applied to best suit different load groups of the chassis structure on the basis of the same extruded base member.

According to another advantageous feature of the present invention, an adhesive or sealing material can be introduced in a joining zone between the base member and the reinforcing member. This provides not only added corrosion protection and edge protection but also increases the strength of the connection. Sealing and/or adhesive materials may thus be applied in addition to the connection by pulse welding.

As described above, folding edges of the reinforcing member completely or only in part can result in further corrosion protection and formfitting connection.

A chassis structure in accordance with the invention combines a base member in the form of an open extruded profile of lesser stiffness and lesser strength but made of lighter light metal material with a highly stiff and high-strength reinforcing member of steel provided at desired regions of the base member. The connection of both components is hereby implemented through pulse welding. Strength and stiffness of the chassis structure can be best suited and tailored to stress-relevant local requirements. It is also possible to design a weight-optimized base member for different load groups by combining reinforcing members of varying geometry and/or different material. A connection through electromagnetic pulse welding results in chassis structures that can be configured to suit respective stress situations and be made of different cross section. This is applicable in particular for suspension arms of lightweight construction to reduce weight and production costs. Various base members and reinforcing members constructed to satisfy different stiffness and strength requirements may be connected to establish a variable modular system. As electromagnetic pulse welding (EMPT) with process times of 20 μs and optimal cycle times of about 5 second is very efficient and can be integrated in a laser welding facility in production lines, also production times and production costs can be positively affected.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3a is a schematic cutaway view of the suspension arm of FIG. 1, depicting a joining zone between a base member and a reinforcing member before joining;

FIG. 3b is a view of the joining zone between a base member and a reinforcing member after joining;

FIG. 4 is a perspective illustration of a section of another embodiment of a chassis structure according to the present invention in the form of a suspension arm; and FIG. 5 is a perspective illustration of a section of yet another embodiment of a chassis structure according to the present invention in the form of a suspension arm.

DETAILED DESCRIPTION OF PREFERRED EMBODIMENTS

Figure 1:
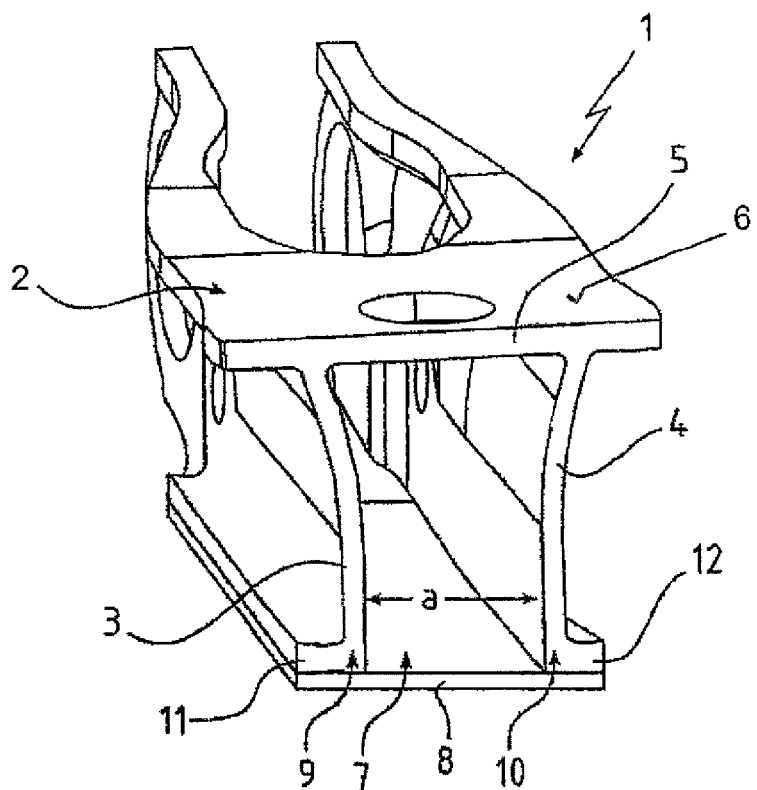
FIG. 1 is a perspective illustration of one embodiment of a chassis structure according to the present invention in the form of a suspension arm.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
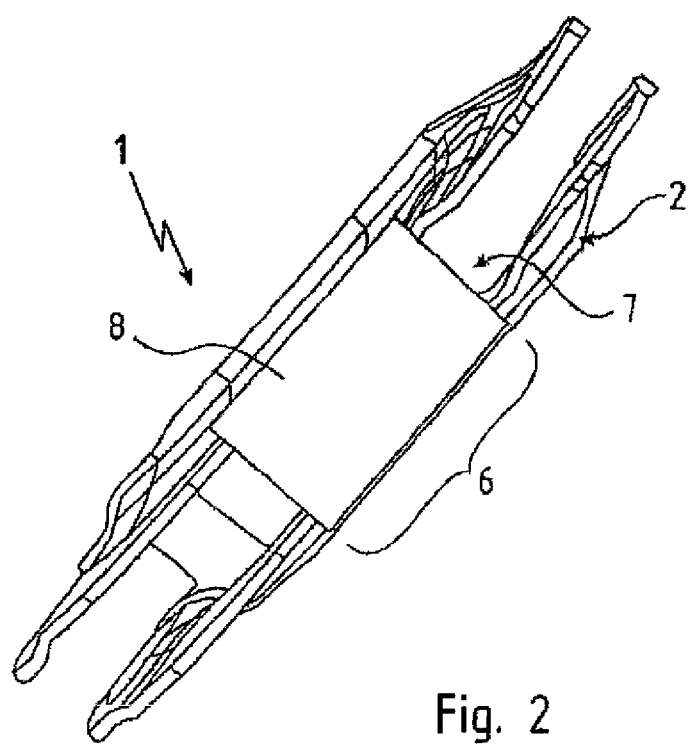
FIG. 2 is a bottom view of the suspension arm of FIG. 1.

Turning now to the drawing, and in particular to FIG. 1, there is shown a perspective illustration of one embodiment of a chassis structure according to the present invention, generally designated by reference numeral 1 and configured in the form of a suspension arm. The chassis component 1 includes an extruded base member 2 which is made of aluminum or aluminum alloy. The base member 2 has a hat-shaped cross section and includes two walls 3, 4 arranged at a distance a from one another and interconnected by a web 5. A stiffness-relevant and strength-relevant region 6, also shown in FIG. 2, provides a spring bearing surface. In opposition to the web 5, the base member 2 has an open side 7 for connection of a reinforcing member 8 which is made of steel. The reinforcing member 8 extends between free ends 9, 10 of the walls 3, 4 and is joined therewith. The connection between the reinforcing member 8 and the free ends 9, 10 of the base member 2 is realized through electromagnetic pulse welding. As a result, a material joint is established between the base member 2, made of various metallic materials, and the reinforcing member 8, without encountering any changes in the microstructure as a result of a temperature impact.

The chassis structure 1 in the form of a suspension arm is thus made of a weight-optimized, extruded base member 2 which is open on one side and made of light metal and which is tailored to be reinforced by the reinforcing member 8 for increasing static and dynamic stress behavior in the region 6 of the spring bearing surface.

The free ends 9, 10 are formed with flanges 11, 12, respectively, which project out from the walls 3, 4 to one side and extend in parallel relationship to the reinforcing member 8. As shown in FIG. 3a, each of flanges 11, 12 of the ends 9, 10 is formed with an indentation 13 provided to enable acceleration of material of the ends 9, 10 during pulse welding and deformation of the material in the indentation 13. The flanges 11, 12 have a width b which is suited to the requirement of joining the base member 2 with the reinforcing member 8 through magnetic deformation.

FIGS. 3a and 3b show schematic cutaway views of the chassis structure 1 in the joining zone between the free end 9 of the wall 3 of the base member 2 and the reinforcing member 8. FIG. 3a shows hereby the joining zone before joining.

The indentation 13 has a depth t between 0.5 mm and 2.0 mm, advantageously from 1.2 mm to 1.7 mm. Currently preferred is a depth t of 1.5 mm. Furthermore, the indentation 13 is bounded by two side walls 14, 15 which extend at an incline towards one another to define an angle α between 120° and 160°. Currently preferred is an angle α of 150°. FIG. 3b shows the joining zone schematically after deformation. The indentation 13 is filled with material from the ends 9, 10 that has been accelerated and deformed by electromagnetic pulse welding. The material is hereby deformed into the indentation 13. As a result, a depression 16 is formed on the opposite side of the flange 11 of the end 9.

To ensure corrosion resistance, the reinforcing member 8 may be provided with a coating. The reinforcing member 8 may, for example, be galvanized or aluminized or coated in a different manner to provide corrosion protection.

Referring now to FIG. 4, there is shown a perspective illustration of a section of another embodiment of a chassis structure according to the present invention, generally designated by reference numeral 1a and configured in the form of a suspension arm. Parts corresponding with those in FIG. 1 are denoted by identical reference numerals and not explained again. The description below will center on the differences between the embodiments. In this embodiment, provision is made for a reinforcing member 8a having lateral flanged folds 17 by which the lateral flanges 11, 12 of the ends 9, 10 can be embraced. As described above, the free ends 9, 10 and the reinforcing member 8a are joined by pulse welding. In addition, the provision of the flanged folds 17 to embrace the flanges 11, 12 of the ends 9, 10 results in a form fit. At assembly, the reinforcing member 8a is placed with its flanged folds 17 over the flanges 11, 12 of the ends 9, 10. The reinforcing member 8a may, of course, also be bent over the flanges 11, 12, when bearing upon the base member 2. The flange folds 17 may be bent also after the chassis structure 1 undergoes electromagnetic pulse welding.

FIG. 5 shows a perspective illustration of a section of yet another embodiment of a chassis structure according to the present invention, generally designated by reference numeral 1b and configured in the form of a suspension arm. The chassis structure 1b differs from the chassis structure 1a of FIG. 4 by the added presence of an adhesive and/or sealing material 18, e.g. glue, in the joining zone between the base member 2 and the reinforcing member 8b. In this way, an additional corrosion protection and edge protection is ensured. Moreover, an additional material joint can be established in this way.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A chassis structure for a motor vehicle, comprising:
   an extruded base member made of light metal, said base member having two walls arranged in spaced-apart relationship and having free ends; and a reinforcing member made of steel to reinforce the base member and connecting the free ends of the walls in at least one region of the base member, wherein the reinforcing member and the base member are joined to one another using electromagnetic pulse welding.

2. The chassis structure of claim 1, wherein the reinforcing member is made from a steel sheet.

3. The chassis structure of claim 1, wherein each end of the walls is formed with an indentation to receive material from the end deformed as a result of pulse welding.

4. The chassis structure of claim 3, wherein the indentation has a depth between 0.5 mm and 2.0 mm.

5. The chassis structure of claim 3, wherein the indentation has a depth between 1.2 mm to 1.7 mm.

6. The chassis structure of claim 3, wherein the indentation has a depth about 1.5 mm.

7. The chassis structure of claim 3, wherein the indentation is bounded by two side faces that extend at an incline in relation to one another to define an angle in a range between 120° and 160°.

8. The chassis structure of claim 3, wherein the indentation is bounded by two side faces that extend at an incline in relation to one another to define an angle of about 150°.

9. The chassis structure of claim 1, wherein the ends of the walls are each formed with a flange projecting laterally out from the walls.

10. The chassis structure of claim 1, wherein the reinforcing member has lateral flanged folds to embrace the ends.

11. The chassis structure of claim 1, further comprising an adhesive or sealing material introduced in a joining zone between the base member and the reinforcing member.

12. The chassis structure of claim 1, wherein the reinforcing member is arranged in a stiffness-relevant or strength-relevant region of the base member.

13. The chassis structure of claim 1, wherein the reinforcing member has a coating.

14. The chassis structure of claim 1, wherein each end of the walls is formed with an indentation to receive material from the reinforcing member deformed as a result of pulse welding.

* * * * *